US 7,802,180 B2

(12) United States Patent
Warner et al.

(10) Patent No.: US 7,802,180 B2
(45) Date of Patent: Sep. 21, 2010

(54) TECHNIQUES FOR SERIALIZATION OF INSTANCES OF THE XQUERY DATA MODEL

(75) Inventors: James W. Warner, Lake Oswego, OR (US); Zhen Hua Liu, San Mateo, CA (US); Muralidhar Krishnaprasad, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1117 days.

(21) Appl. No.: 11/246,429

(22) Filed: Oct. 6, 2005

(65) Prior Publication Data

US 2006/0036935 A1 Feb. 16, 2006

Related U.S. Application Data

(63) Continuation-in-part of application No. 10/948,523, filed on Sep. 22, 2004, now Pat. No. 7,516,121.

(60) Provisional application No. 60/582,706, filed on Jun. 23, 2004.

(51) Int. Cl.
*G06N 3/00* (2006.01)
(52) U.S. Cl. ...................................... 715/234
(58) Field of Classification Search ................. 715/234, 715/243, 254
See application file for complete search history.

(56) References Cited

U.S. PATENT DOCUMENTS

| 4,439,837 | A | 3/1984 | Aiena et al. |
| 4,536,873 | A | 8/1985 | Leete |
| 5,088,032 | A | 2/1992 | Bosack |
| 5,295,261 | A | 3/1994 | Simonetti |
| 5,404,513 | A | 4/1995 | Powers et al. |
| 5,467,471 | A | 11/1995 | Bader |
| 5,590,324 | A | 12/1996 | Leung et al. |
| 5,625,815 | A | 4/1997 | Maier et al. |
| 5,630,125 | A | 5/1997 | Zellweger |

(Continued)

FOREIGN PATENT DOCUMENTS

EP    1 241 589 A2    9/2002

(Continued)

OTHER PUBLICATIONS

McHugh et al., "Query Optimization for XML," 1999, 25th VLDB Conference, pp. 315-326.*

(Continued)

*Primary Examiner*—Kyle R Stork
(74) *Attorney, Agent, or Firm*—Hickman Palermo Truong & Becker LLP

(57) ABSTRACT

A method for representing XML information is provided. A serialized image of XML information is generated. The serialized image comprises a collection of one or more serialized data values, where each particular serialized data value in the collection includes data associated with a particular serialized data value type of a plurality of serialized data value types. The serialized image may also comprise a first field that includes a first value, which indicates that the serialized image includes the collection of one or more serialized data values. In some embodiments, the method is performed at a database system that supports a native XML data type, wherein the XML information is one or more instances of the native XML data type.

34 Claims, 5 Drawing Sheets

U.S. PATENT DOCUMENTS

| | | |
|---|---|---|
| 5,680,614 A | 10/1997 | Bakuya et al. |
| 5,724,577 A | 3/1998 | Exley et al. |
| 5,734,887 A | 3/1998 | Kingberg et al. |
| 5,878,410 A | 3/1999 | Zbikowski et al. |
| 5,878,415 A | 3/1999 | Olds |
| 5,905,982 A | 5/1999 | Carey et al. |
| 5,960,194 A | 9/1999 | Choy et al. |
| 5,974,407 A | 10/1999 | Sacks |
| 5,983,215 A | 11/1999 | Ross et al. |
| 5,987,506 A | 11/1999 | Carter et al. |
| 5,999,941 A | 12/1999 | Andersen |
| 6,012,067 A | 1/2000 | Sarkar |
| 6,038,563 A | 3/2000 | Bapat et al. |
| 6,055,544 A | 4/2000 | DeRose et al. |
| 6,061,684 A | 5/2000 | Glasser et al. |
| 6,108,698 A | 8/2000 | Tenev et al. |
| 6,128,610 A | 10/2000 | Srinivasan et al. |
| 6,141,655 A | 10/2000 | Johnson et al. |
| 6,154,741 A | 11/2000 | Feldman |
| 6,199,195 B1 | 3/2001 | Goodwin et al. |
| 6,208,993 B1 | 3/2001 | Shadmon |
| 6,236,988 B1 | 5/2001 | Aldred |
| 6,240,407 B1 | 5/2001 | Chang et al. |
| 6,253,195 B1 | 6/2001 | Hudis et al. |
| 6,263,332 B1 | 7/2001 | Nasr et al. |
| 6,269,380 B1 | 7/2001 | Terry et al. |
| 6,279,006 B1 | 8/2001 | Shigemi et al. |
| 6,279,007 B1 | 8/2001 | Uppala |
| 6,282,537 B1 | 8/2001 | Madnick et al. |
| 6,298,349 B1 | 10/2001 | Toyoshima et al. |
| 6,341,289 B1 | 1/2002 | Burroughs et al. |
| 6,343,287 B1 | 1/2002 | Kumar |
| 6,356,920 B1 | 3/2002 | Vandersluis |
| 6,366,934 B1 | 4/2002 | Cheng et al. |
| 6,370,537 B1 | 4/2002 | Gilbert et al. |
| 6,418,448 B1 | 7/2002 | Sarkar |
| 6,438,540 B2 | 8/2002 | Nasr et al. |
| 6,438,562 B1 | 8/2002 | Gupta et al. |
| 6,449,620 B1 | 9/2002 | Draper et al. |
| 6,470,344 B1 | 10/2002 | Kothuri et al. |
| 6,487,546 B1 | 11/2002 | Witkowski |
| 6,496,842 B1 | 12/2002 | Lyness |
| 6,510,434 B1 | 1/2003 | Anderson et al. |
| 6,516,327 B1 | 2/2003 | Zondervan et al. |
| 6,542,911 B2 | 4/2003 | Chakraborty et al. |
| 6,571,231 B2 | 5/2003 | Sedlar |
| 6,574,655 B1 | 6/2003 | Libert et al. |
| 6,584,458 B1 | 6/2003 | Millett et al. |
| 6,584,459 B1 | 6/2003 | Chang et al. |
| 6,604,100 B1 | 8/2003 | Fernandez et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,654,734 B1 | 11/2003 | Mani et al. |
| 6,654,761 B2 | 11/2003 | Tenev et al. |
| 6,662,342 B1 | 12/2003 | Marcy |
| 6,675,230 B1 | 1/2004 | Lewallen |
| 6,684,204 B1 | 1/2004 | Lal |
| 6,708,186 B1 | 3/2004 | Claborn et al. |
| 6,718,322 B1 | 4/2004 | Brye |
| 6,721,723 B1 | 4/2004 | Gibson et al. |
| 6,721,727 B2 | 4/2004 | Chau et al. |
| 6,721,747 B2 | 4/2004 | Lipkin |
| 6,725,212 B2 | 4/2004 | Couch et al. |
| 6,732,222 B1 | 5/2004 | Garritsen et al. |
| 6,754,661 B1 | 6/2004 | Hallin et al. |
| 6,772,350 B1 | 8/2004 | Belani et al. |
| 6,772,412 B2 | 8/2004 | Kuznetsov |
| 6,778,977 B1 | 8/2004 | Avadhanam et al. |
| 6,782,380 B1 | 8/2004 | Thede |
| 6,785,673 B1 | 8/2004 | Fernandez et al. |
| 6,795,821 B2 | 9/2004 | Yu |
| 6,801,224 B1 | 10/2004 | Lewallen |
| 6,804,677 B2 | 10/2004 | Shadmon et al. |
| 6,826,568 B2 | 11/2004 | Bernstein et al. |
| 6,826,727 B1 | 11/2004 | Mohr et al. |
| 6,836,778 B2 | 12/2004 | Manikutty et al. |
| 6,836,857 B2 | 12/2004 | Ten-Hove et al. |
| 6,871,204 B2 | 3/2005 | Krishnaprasad et al. |
| 6,889,231 B1 | 5/2005 | Souder et al. |
| 6,915,304 B2 | 7/2005 | Krupa |
| 6,915,307 B1 | 7/2005 | Mattis et al. |
| 6,918,082 B1 | 7/2005 | Gross et al. |
| 6,964,025 B2 | 11/2005 | Angiulo et al. |
| 7,028,028 B1 | 4/2006 | Balmin et al. |
| 7,031,956 B1 | 4/2006 | Lee et al. |
| 7,043,716 B2 | 5/2006 | Zimmer et al. |
| 7,051,042 B2 * | 5/2006 | Krishnaprasad et al. ..... 707/102 |
| 7,062,507 B2 | 6/2006 | Wang et al. |
| 7,072,896 B2 | 7/2006 | Lee et al. |
| 7,124,137 B2 | 10/2006 | Lin et al. |
| 7,134,072 B1 | 11/2006 | Lovett et al. |
| 7,139,746 B2 | 11/2006 | Shin et al. |
| 7,171,407 B2 | 1/2007 | Barton et al. |
| 7,181,438 B1 | 2/2007 | Szabo |
| 2001/0037345 A1 | 11/2001 | Kiernan et al. |
| 2002/0015042 A1 | 2/2002 | Robotham et al. |
| 2002/0029229 A1 | 3/2002 | Jakopac et al. |
| 2002/0035606 A1 | 3/2002 | Kenton |
| 2002/0038358 A1 | 3/2002 | Sweatt, III et al. |
| 2002/0054090 A1 | 5/2002 | Silva et al. |
| 2002/0056025 A1 | 5/2002 | Qiu et al. |
| 2002/0073019 A1 | 6/2002 | Deaton |
| 2002/0073236 A1 | 6/2002 | Helgeson et al. |
| 2002/0087510 A1 | 7/2002 | Weinberg et al. |
| 2002/0087596 A1 | 7/2002 | Lewontin |
| 2002/0100027 A1 | 7/2002 | Binding et al. |
| 2002/0116371 A1 | 8/2002 | Dodds et al. |
| 2002/0116457 A1 | 8/2002 | Eshleman et al. |
| 2002/0120685 A1 | 8/2002 | Srivastava et al. |
| 2002/0123993 A1 | 9/2002 | Chau et al. |
| 2002/0124100 A1 | 9/2002 | Adams |
| 2002/0133484 A1 | 9/2002 | Chau et al. |
| 2002/0143512 A1 | 10/2002 | Shamoto et al. |
| 2002/0156772 A1 | 10/2002 | Chau et al. |
| 2002/0156811 A1 | 10/2002 | Krupa |
| 2002/0169788 A1 | 11/2002 | Lee et al. |
| 2002/0184188 A1 | 12/2002 | Mandyam et al. |
| 2002/0184401 A1 | 12/2002 | Kadel, Jr. et al. |
| 2002/0194157 A1 | 12/2002 | Zait et al. |
| 2002/0198874 A1 | 12/2002 | Nasr et al. |
| 2003/0004937 A1 | 1/2003 | Salmenkaita et al. |
| 2003/0009361 A1 | 1/2003 | Hancock et al. |
| 2003/0014397 A1 | 1/2003 | Chau et al. |
| 2003/0028563 A1 | 2/2003 | Stutz et al. |
| 2003/0033285 A1 | 2/2003 | Jalali et al. |
| 2003/0065659 A1 | 4/2003 | Agarwal et al. |
| 2003/0078906 A1 | 4/2003 | Ten-Hove et al. |
| 2003/0093672 A1 | 5/2003 | Cichowlas |
| 2003/0101194 A1 | 5/2003 | Rys et al. |
| 2003/0105732 A1 | 6/2003 | Kagalwala et al. |
| 2003/0126136 A1 | 7/2003 | Omoigui |
| 2003/0140308 A1 | 7/2003 | Murthy et al. |
| 2003/0154204 A1 | 8/2003 | Chen-Wright et al. |
| 2003/0158897 A1 | 8/2003 | Ben-Natan et al. |
| 2003/0167277 A1 | 9/2003 | Hejlsberg et al. |
| 2003/0167456 A1 | 9/2003 | Sabharwal |
| 2003/0172135 A1 | 9/2003 | Bobick et al. |
| 2003/0182624 A1 | 9/2003 | Large |
| 2003/0200214 A1 | 10/2003 | Doole et al. |
| 2003/0204787 A1 | 10/2003 | Bartucca et al. |
| 2003/0212662 A1 | 11/2003 | Shin et al. |
| 2003/0226111 A1 | 12/2003 | Wirts et al. |
| 2003/0229529 A1 | 12/2003 | Mui et al. |

| | | |
|---|---|---|
| 2003/0233618 A1 | 12/2003 | Wan |
| 2004/0006563 A1 | 1/2004 | Zwiegincew et al. |
| 2004/0015783 A1 | 1/2004 | Lennon et al. |
| 2004/0043758 A1 | 3/2004 | Sorvari et al. |
| 2004/0064466 A1 | 4/2004 | Manikutty et al. |
| 2004/0088415 A1 | 5/2004 | Chandrasekar et al. |
| 2004/0143581 A1 | 7/2004 | Bohannon et al. |
| 2004/0148278 A1 | 7/2004 | Milo et al. |
| 2004/0167904 A1 | 8/2004 | Wen et al. |
| 2004/0176958 A1 | 9/2004 | Salmenkaita et al. |
| 2004/0177080 A1 | 9/2004 | Doise et al. |
| 2004/0193575 A1 | 9/2004 | Chen et al. |
| 2004/0199524 A1 | 10/2004 | Rys et al. |
| 2004/0205082 A1 | 10/2004 | Fontoura et al. |
| 2004/0215600 A1 | 10/2004 | Aridor et al. |
| 2004/0220912 A1 | 11/2004 | Manikutty et al. |
| 2004/0220927 A1 | 11/2004 | Murthy et al. |
| 2004/0221226 A1 | 11/2004 | Lin et al. |
| 2004/0225680 A1 | 11/2004 | Cameron et al. |
| 2004/0230667 A1 | 11/2004 | Wookey |
| 2004/0255046 A1 | 12/2004 | Ringseth et al. |
| 2004/0260691 A1 | 12/2004 | Desai et al. |
| 2004/0267719 A1 | 12/2004 | Doherty et al. |
| 2004/0267760 A1 | 12/2004 | Brundage et al. |
| 2005/0004892 A1 | 1/2005 | Brundage et al. |
| 2005/0010896 A1 | 1/2005 | Meliksetian et al. |
| 2005/0022115 A1 | 1/2005 | Baumgartner et al. |
| 2005/0044078 A1 | 2/2005 | DeVries et al. |
| 2005/0050058 A1 | 3/2005 | Jain et al. |
| 2005/0050059 A1 | 3/2005 | Van Der Linden et al. |
| 2005/0050092 A1 | 3/2005 | Jain et al. |
| 2005/0091188 A1 | 4/2005 | Pal et al. |
| 2005/0097084 A1 | 5/2005 | Balmin et al. |
| 2005/0102256 A1 | 5/2005 | Bordawekar et al. |
| 2005/0114314 A1 | 5/2005 | Fan et al. |
| 2005/0138047 A1 | 6/2005 | Liu et al. |
| 2005/0160076 A1 | 7/2005 | Kanemasa |
| 2005/0160108 A1 | 7/2005 | Charlet et al. |
| 2005/0210002 A1 | 9/2005 | Pal et al. |
| 2005/0228768 A1 | 10/2005 | Thusoo et al. |
| 2005/0228786 A1 | 10/2005 | Murthy et al. |
| 2005/0228792 A1 | 10/2005 | Chandrasekaran et al. |
| 2005/0229158 A1 | 10/2005 | Thusoo et al. |
| 2005/0289125 A1 | 12/2005 | Liu et al. |
| 2005/0289138 A1 | 12/2005 | Cheng et al. |
| 2005/0289175 A1 | 12/2005 | Krishnaprasad et al. |
| 2006/0010124 A1 | 1/2006 | Lucas et al. |
| 2006/0031204 A1 | 2/2006 | Liu et al. |
| 2006/0031233 A1 | 2/2006 | Liu et al. |
| 2006/0195476 A1 | 8/2006 | Nori et al. |
| 2006/0212467 A1 | 9/2006 | Murthy et al. |
| 2006/0224576 A1 | 10/2006 | Liu |

FOREIGN PATENT DOCUMENTS

| | | |
|---|---|---|
| GB | 2409078 A | 6/2005 |
| WO | WO 00/49533 A2 | 8/2000 |
| WO | WO 01/42881 A2 | 6/2001 |
| WO | WO 01/59602 A1 | 8/2001 |
| WO | WO 01/61566 A1 | 8/2001 |
| WO | WO 03/027908 A | 4/2003 |
| WO | WO 03/027908 A2 | 4/2003 |

OTHER PUBLICATIONS

"XQuery 1.0 and XPath 2.0 Functions and Operators," W3C, Nov. 12, 2003, available at: <http://www.w3c.org/TR/2003/WD-xpath-functions-20031112>, pp. 1-193.*
European Patent Office, "Communication Pursuant to Article 94(3) EPC", Application No. 05 760 442.3-2201, dated Jun. 20, 2008, 2 pages.
Claims, Application No. 05 760 442.3-2201, 8 pages.

Banerjee, Sandeepan et al., "Oracle8*i*—The XML Enabled Data Management System" —Oracle Corporation, Mar. 2000, IEEE, pp. 561-568.
Bohannon, Philip, et al., "From XML Schema to Relations: A Cost-Based Approach to XML Storage" —Bell Laboratories, IEEE—2002—Proceedings of the 18th International Conference on Data Engineering (ICDE '02), pp. 1-28.
Bourret, R. et al.: A generic Load/Extract Utility for Data Transfer Between XML Documents and Relational Databases, Jun. 8-9, 2000, IEEE Computing SOC., pp. 134-143.
Braga, Daniele et al., "A Graphical Environment to Query XML Data with Query," Proceedings of the Fourth International Conference on Web Information Systems Engineering (WISE '03), 2003, IEEE, 10 pages.
Chae, MI-OK et al., "Design and Implementation of an Object-Oriented Multimedia DBMS Tightly Coupled with Information Retrieval Functions," Proc. 17*th* IASTED International Conference on Applied Informatics, Feb. 15-18, 1999, abstract.
Chen, Ruey-Shun et al., "Developing an XML framework for metadata system", Trinity College Dublin, Proc. of the 1st Inter. Sympo. on Information and Communication, pp. 267-272.
Choi, Byron et al., "The XQuey Formal Semantics: A Foundation for Implementation Optimization," May 31, 2002, IEEE XP-002353605, 15 pages.
Dayen, I., "Storing XML in Relational Databases", *XML.com*, XP-002275971(1998-2004), pp. 1-13.
Drake, Mark et al., "Understanding the Oracle9*i* XML Type," Oracle Corporation, 2004, http://otn.oracle.com/oramag/oracle/01-nov/o61xml.html?_template=/ocom/technology, data retrieved Jun. 29, 2004, pp. 1-5.
Funderbunk, J. et al., "XML programming with SQL/XML and XQuery", *IBM Systems Journal*, XP-002295973 (2002), pp. 642-665.
Gennick, Johnathan, "SQL in, XML out," Oracle Corporation, 2004, http://otn.oracle.com/oramag/oracle/03-may/o33xml.html?_template=/ocom/technology, data retrieved Jun. 29, 2004.
Higgins, Shelley, "Oracle9*i*, Application Developer's Guide—XML," Oracle Corporation, Release 1 (9.0.1), Jun. 2001, Part No. A88894-01, pp. 1-1,362. (On CD-Rom).
Higgens, Shelley, "Oracle9*i*, Case Studies—XML Applications," Oracle Corporation ,Release 1 (9.0.1), Jun. 2001, Part No. A88895-01, pp. 1-462 (On CD-Rom).
Jajodia, Sushil, et al., "Toward a Multilevel Secure Relational Data Model," ACM, 1991, 8393 SIGMOD Record, 20 (1991) Jun., No. 2, New York, US, XP 000364619, pp. 50-59.
Kang, Ji-Hoon et al., "An XQuery Engine for Digital Library Systems that support XML data," Proceedings of the 2004 International Symposium on Application and the Internet Workshops, IEEE XP-0010684128, 5 pages.
Khan, Latifur, "A Performance Evaluation of Storing XML Data in Relational Database Management Systems" —and Yan Rao—ACM-2001 (pp. 31-38).
Lawrence et al. "Integrating Relational Database Schemas Using a Standardized Dictionary" —2001—ACM (pp. 225-230).
Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.
McHugh, Jason et al., "Query Optimization for XML", XP-002333353, *Proceedings of the 25th VLDB Conference* (1999) pp. 315-326.
Melton, Jim, "ISO-ANSI Working Draft, XML-Related Specifications (SQL/XML)," WG3: DRS-020, H2-2002-365, Aug. 2002, 154 pages.
Murthy, Ravi et al., "XML Schemas in Oracle XML DB," Proceedings of the 29th VLDB Conference, 2003, IEEE XP-002353604, pp. 1009-1018.
Noser, Hansrudi et al., "Dynamic 3D Visualization of Database-Defined Tree Structures on the WWW by Using Rewriting Systems," 2000, IEEE, XP-002262516, pp. 247-254.
Oracle Corporation, "Oracle9*i* Application Server, Administrator's Guide," Release 2 (9.0.2), May 2002, Part No. A92171-02, Part No. A92171-02, pp. 1-392. (On CD-Rom).

Oracle Corporation, "Oracle9i XML Database Developer's Guide—Oracle XML DB," Release 2 (9.2), Mar. 2002, Part No. A96620-1, pp. 10-1-10-54.

Oracle Corporation, "Oracle9i XML Database Developer's Guide—Oracle XML DB," Release 2 (9.2), Mar. 2002, Part No. A96620-1, pp. 5-8-5-10, 5-21-5-24 and 5-32-5-52.

Peng, Feng et al., "XPath queries on streaming data", 2003, ACM Press, pp. 431-442.

Ramakrishnan, Ragu et al., "SRQL: Sorted Relational Query Language" Jul. 1-3, 1998, IEEE, pp. 84-95.

Schmidt et al.—"Efficient Relational Storage and Retrieval of XML Documents" CWI, The Netherlands (pp. 1-6).

Shanmugasundaram, Jayavel, et al., "Querying XML Views of Relational Data," Proceedings of the 27$^{th}$ Very Large Databases Conference, Rome, Italy, Sep. 2001, pp. 261-270.

Vion-Dury, Jean-Yves, "XPath on left and right sides of rules: toward compact XML tree rewriting through node patterns", 2003, ACM Press, pp. 19-25.

Vorthmann, Scott et al., "Beyond Schemas, Schema Adjuncts and the Outside World," Markup Languages, Online!, vol. 2, No. 3, Jun. 2000, pp. 1-8.

W3C, "XML Schema Part 1: Structures," W3C Recommendation, May 2, 2001, retrieved from the internet :<http://www.w3.org/TR/2001/REC-xmlschema-1-20010502/>, retrieved on Apr. 14, 2005, pp. 1-186.

W3C, "XML Schema Part 2: Datatypes," W3C Recommendation, May 2, 2001, retrieved from the internet:<http://www.w3.org/TR/2001/REC-xmlschema-2-20010502/>, retrieved on Apr. 14, 2005, pp. 1-138.

W3C, "XQuery 1.0: An XML Query Language," W3C Recommendation, Working Draft, Oct. 29, 2004, retrieved from the internet<http://www.w3.org/TR/2004/WD-xquery-20041029>, retrieved on Apr. 14, 2005, pp. 1-189.

W3C, "XQuery 1.0: An XML Query Language," W3C Working Draft dated Apr. 4, 2005, 170 pages.

W3C, "Extensible Markup Language (XML) 1.0 (Third Edition)", W3C Recommendation, dated Feb. 4, 2004, 34 pages.

W3C, "XQuery 1.0 and XPath 2.0 Data Model," W3C Working Draft dated Apr. 4, 2005, 91 pages.

W3C, "XML Path Language (XPath) 2.0," W3C Working Draft Dated Apr. 4, 2005, 89 pages.

W3C, "XSL Transformations (XSLT) Version 2.0," W3C Working Draft dated Apr. 4, 2005, 346 pages.

Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.

Zhang, Hui et al., "XQuery rewriting at the relational algebra level," Computer Systems Science and Engineering, vol. 18, No. 5, Sep. 2003, IEEE XP-009056809, pp. 241-262.

Zhang, Xin et al., "Honey, I Shrunk the XQuery! —An XML Algebra Optimization Approach," Submission for WIDM'02, IEEE XP-002316448, 14 pages.

International Searching Authority, "Notification of Transmittal of the International Search Report and the Written Opinion of the International Searching Authority, or the Declaration," PCT/US2005/021259, dated Nov. 24, 2005, 13 pages.

Current Claims, PCT/US2005/021259, 15 pages.

International Preliminary Examination Report, Application No. PCT/US03/35551, Oct. 8, 2004, pp. 1-17.

Written Opinion, Application No. PCT/US03/35551, Nov. 10, 2004, 6 pages.

Current claims in PCT/US03/35551, pp. 1-4.

International Preliminary Examination Report, Application No. PCT/US02/30783, Apr. 1, 2004, 15 pages.

Current claims in PCT/US02/30783, pp. 1-8.

International Searching Authority, "Notification of Transmittal of the International Search Report and the Written Opinion of the International Authority, or the Declaration," Nov. 2, 2004, PCT/US2004/010018, 14 pages.

PCT/US2004/010018—current claims.

International Preliminary Examining Authority, "Notification of Transmittal of the International Preliminary Report on Patentability," PCT/US2005/021259, dated Feb. 2, 2007, 9 pages.

Claims, PCT/US2005/021259, dated Nov. 30, 2006, 8 pages (attached).

Rys, Michael et al., "Integrating XQuery and Relational Database Systems," Chapter 7—*XQuery from the Experts: A Guide to the W3C XML Query Language*, Addison Wesley Professional, Aug. 22, 2003, ISBN 978-0-321-18060-5, pp. 353-391.

Cheng, Josephine et al., "IBM DB2 XML Extender, An end-to-end solution for storing and retrieving XML documents.," IEEE, ICDE '00 Conference, San Diego, Feb. 2000, 128 pages.

Cooper, Brian F. et al., " A Fast Index for Semistructured Data ," Proceeding of the International Conference on Very Large Databases, 2001, XP-002303292, pp. 341-350.

Hierarchical Queries, XP-002295972, pp. 8-3 to 8-7, 14 pages.

McHugh, Jason, et al. "Indexing Semistructured Data," Stanford Science Department, 1998, XP-002248313, pp. 1-21.

Shanmugasundaram J., et al. "Querying XML Views of Relational Data," Proceedings of the 27$^{th}$ Very Large Databases Conference, Rome, Italy, Sep. 2001, pp. 261-270.

Zhang, Wansong, et al., "An Encoding Scheme for Indexing XML Data," E-Commerce and E-Service, 2004, XP-010697639, pp. 526-529.

Notification of Transmittal of the International Search Report and the Written Opinion of the International Searching Authority, or the Declaration received from International application No. PCT/US2005/011762.

Pending claims from International application No. PCT/US2005/011762.

International Preliminary Examination Report, Application No. PCT/US02/30783, Apr. 1, 2004, pp. 1-14.

Current claims in PCT/US02/30783, pp. 1-8.

International Searching Authority, International Search Report and Written Opinion, PCT/US2004/010018, dated Nov. 11, 2004, 14 pages.

PCT/US2004/010018—current claims.

European Patent Office, "Communication Pursuant to Article 96(2) EPC," EP App. No. 02799692.5, dated Jan. 18, 2006, 5 pages.

Current Claims PCT/US02/31168, EP App. No. 02799692.5, 8 pages.

International Searching Authority, "Notification of Transmittal of the International Search Report and the Written Opinion of the International Searching Authority, or the Declaration," PCT/US2005/021259, dated Nov. 24, 2005, 13 pages.

Current Claims, PCT/US2005/021259, 15 pages.

International Searching Authority, "Notification of Transmittal of the International Search Report and the Written Opinion of the International Searching Authority, or the Declaration," PCT/US2005/011763, dated Aug. 6, 2005, 12 pages.

Current Claims, PCT/US2005/011763, 4 pages.

International Searching Authority, "Notification of the Transmittal of the International Search Report and the Written Opinion of the International Searching Authority, or the Declaration," PCT/US2005/020795, Mailing Date Sep. 27, 2005, 13 pages.

Current Claims, PCT/US2005/020795, 5 pages.

Katz, Howard et al., "Integrating XQuery and Relational Database Systems," Chapter 7—*XQuery from the Expertrs: A Guide to the W3C XML Query Language*, Addison Wesley Professional, Aug. 22, 2003, ISBM 978-0-321-18060-5, pp. 353-391.

Zemke, Fred, "XML Query," Change Proposal, ISO/IEC JTC1/SC32 WG3:SIA-nnn ANSI NCITS H2-2004-02lrl, Mar. 14, 2004, 29 pages.

International Preli Minary Examining Authority, "Written Opinion," PCT/US2005/021259, dated Oct. 13, 2006, 7 pages.

Current Claims, PCT/US2005/021259, 10 pages.

Lo et al., "XAS: A System for Accessing Componentized, Virtual XML Documents," IEEE, 2001, pp. 493-502.

Zisman et al., "Using XML to Build Consistency Rules for Distributed Specifications," Proceedings of the Tenth International Workshop on Software Specification and Design (IWSD'00), IEEE 2000, 8 pages.

Myllymaki, Jussi, "Effective Wed data Extraction with Standard XML Technologies," WWW10, May 1-5, 2001, pp. 689-696.

Schmidt et al., "Why and How to Benchmark XML Databases," SIGMOND Record, vol. 3, No. 3, Sep. 2001, pp. 27-32.

Oracle, "Oracle 9i XML Developer's Kits Guide—XDK" Release 2 (9.2) Online retrieved at www.oracle.com/pls/db92/db92.docindex, Mar. 2002, 774 pages (Chapters 13-19 extracted, 88 pages).

Oracle Corporation, "Oracle9i XML Database Developer's Guide—Oracle XML DB," Release 2 (9.2), Mar. 2002, Part No. A96620-01, pp. 5-8-5-10, 5-21-5-24, 5-52-5-70, 10-5-10-20 and 11-1-11-20 (60 pgs).

Japanese Patent Office, "Notice of Grounds of Rejection", Patent application No. 533163/2003, mailed Aug. 21, 2008 / received Aug. 21, 2008, 7 pages.

Claims, Patent application No. 533163/2003, 9 pages.

Tomoharu, Asami, "Development of Database System by XML, Relaxer, and JDBC", partial English translation, XML Press, Gijutsu-Hyohron Co., Jul. 10, 2001, vol. 3, 2 pages.

Makoto, Onizuka, "XML and Database", partial English translation, XML Magazine, Shoeisha Co., Ltd., Jul. 1, 2000, vol. 10, No. 3, 1 page.

Hironobu, Koyaku, "What is brought to SQL Server 2000 by XML?", partial English translation, Enterprise Servers, IDG Japan, Dec. 1, 2000, vol. 3, No. 12, 1 page.

W3C, "XML Syntax for XQuery 1.0 (XQueryX)," W3C Recommendation, Working Draft, Dec. 19, 2003, retrieved from the internet<http://www.w3.org/TR/2003/WD-xquery-20031219>, retrieved on Apr. 12, 2005, pp. 1-55.

"Oracle 9i Project XDB"—The XML Database—Oracle—2001 (PPS 1-19).

International Preliminary Examining Authority, "Notification Concerning Informal Communications with the Applicant," PCT/US2005/021259, dated May 11, 2006, 4 pgs.

European Patent Office, "Communication Pursuant to Article 96(2) EPC," App. No. 01 970 715.7, dated Jul. 19, 2006, 8 pgs.

Amended Claims, App. No. 01 970 715.7 13 pgs.

Florescu, Daniela et al., "A Performance Evaluation of Alternative Mapping Schemes for Storing XML Data in a Relational Database," INRIA Rocquencourt P Project Rodin—Rapport De Recherche, May 1999, pp. 1-32.

Chen, Cindy Xinmin, et al., "XML Queries SQL," Proceedings of the First International Conference on Web-Age Information Management, ISBN: 3-540-67627-9, 9 pages.

Cheng, Josephine, et al., "XML and DB2," 16$^{th}$ International Conference on Data Engineering, May 2000, 5 pages.

Australian Office Action; Examiner's first report on patent application No. 2001290693, dated Jun. 27, 2006, 4 pgs.

Australian Application No. 2001290693—current claims, 17 pgs.

International Preliminary Examining Authority, "Notification of Transmittal of the International Preliminary Report on Patentability," PCT/US2005/011763, received May 15, 2006, 10 pages (including 3 pages of claims).

IP Australia, "Examiner's Report No. 2, "Patent App. 2001290693, received Mar. 8, 2007, 2 pages.

Current Claims Patent App. 2001290693, 7 pages.

Gennick, Jonathan, "SQL in, XML out", May/Jun. 2003, Oracle Magazine, 5 pgs.

"Notice of Allowance and Fee Due" received in 10/944, 170 dated Apr. 7, 2008, 8 pgs.

Office Action from China for foreign patent application No. 200480011704.3 dated Feb. 29, 2008 (6 pgs).

Current claims in China for foreign patent application No. 200480011704.3 (4 pgs).

Oracle 9I-XML Database Developer's Guide-Oracle, XML DB, Release 2(9.2), Part No. A96620-02, Part IV Chapter 10, 10-1~10-21, Shelley Higgins (24 pgs).

Australian Governement, "Examiner's first report on patent application No. 2007229359", received Mar. 5, 2008, 2 pgs.

Claims, patent application No. 2007229359, 8 pgs.

Australian Government, "Examiner's first report on patent application No. 2007229358", received Mar. 5, 2008, 2 pgs.

Claims, patent application No. 2007229358, 8 pgs.

Damiani, Ernesto et al., "Securing XML Documents", LNCS 1777, Mar. 2000, 15 pgs.

Damiani, Ernesto, et al., "Design and Implementation of an access control processor for XML documents", Computer Networks 33 (2000), Jun. 2000, 17 pgs.

Rollman, Rich, "SQL Server 2000 XML Enhancements", Microsoft Corp., Powerpoint Presentation at Mircrosoft TechEd, Jun. 2000, 42 pgs.

* cited by examiner

TECHNIQUES FOR SERIALIZATION OF INSTANCES OF THE XQUERY DATA MODEL

PRIORITY CLAIM; CROSS-REFERENCE TO RELATED APPLICATIONS

This application is a continuation-in-part of U.S. patent application Ser. No. 10/948,523, entitled "EFFICIENT EVALUATION OF QUERIES USING TRANSLATION", filed by Zhen Hua Liu et al on Sep. 22, 2004 now U.S. Pat. No. 7,516,121, the entire contents of which are incorporated by reference for all purposes as if fully set forth herein, which claims the benefit of U.S. Provisional Application No. 60/582,706, filed Jun. 23, 2004, entitled "TECHNIQUES FOR PROCESSING XQUERY QUERIES IN A RELATIONAL DATABASE MANAGEMENT SYSTEM," by Zhen Hua Liu et al, the entire contents of which are incorporated by reference for all purposes as if fully set forth herein. The present application claims priority to all previously filed applications mentioned in this paragraph.

This application is related to U.S. patent application Ser. No. 10/428,393, entitled "TECHNIQUES FOR TRANSFERRING A SERIALIZED IMAGE OF XML DATA", filed by Muralidhar Krishnaprasad et al. on May 1, 2003, referred to hereafter as the "'393 application", the entire contents of which are herein incorporated by reference as if fully set forth herein.

FIELD OF THE INVENTION

The present invention generally relates to extensible Markup Language (XML). The invention relates more specifically to a method for representing XML information.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The eXtensible Markup Language (XML) is a standard for data and documents that is finding wide acceptance in the computer industry. XML describes and provides structure to a body of data, such as a file, a data stream, or a data packet. The specification for XML was developed by the W3C consortium and is located on the Internet at "http://www.w3.org/XML". As initially defined, the XML specification organizes information in XML nodes, where the XML nodes form a tree that consists of a root node and all the nodes that are hierarchically dependent on the root node. A tree of XML nodes whose root node is of a "Document Node" type is referred to as an XML document; a tree whose root node is not of a "Document Node" type is referred to as an XML fragment.

For example, the following Segment A

```
<?xml version="1.0">
<book>
    <publication publisher="Doubleday"
        year="2003"></publication>
    <author>Mark Berry</author>
</book>
``` is an XML 1.0 document as indicated by the <?xml version="1.0"> declaration. On the other hand, the following Segment B

```
<book>
    <publication publisher="Doubleday"
        year="2003"></publication>
    <author>Mark Berry</author>
</book>
``` is an XML fragment because its root node "<book>" is not a document node.

As initially defined, the XML specification provides for tags that delimit the sections of an XML entity, which sections are also referred to as XML elements. The data included between the tags is referred to as the XML element's content. Each XML element may contain one or more name-value pairs referred to as attributes. For example, in Segment B above, the start tag "<author>" and the end tag "</author>" delimit an XML element whose content is "Mark Berry". The XML element delimited between the "<publication>" and "</publication>" tags includes two attributes: "publisher" which has a value of "Doubleday", and "year" which has a value of "2003".

The wide acceptance of XML as a standard for processing data led to the development of XML-enabled database systems. Some XML-enabled Relational Database Systems (RDBMS) and Object-Relational Database Systems (ORDBMS) provide a native built-in data type (referred to herein as XMLType) which allows users to store XML data natively via the use of XMLType tables or XMLType columns. Other XML-enabled database systems provide extensions and plug-ins that are capable of accessing and processing XML data stored as XML documents in XML repositories or other storage.

The ability to store XML data in database systems in turn led to the development of a new query language, the XML Query Language (referred to hereinafter as "XQuery"), for accessing and querying a broad spectrum of XML data and XML information resources. In order to support this new query language, a new data model, the XQuery Data Model, was developed. The XQuery Data Model defines precisely the information contained in the input to an XSLT or XQuery processing system and also defines all permissible values of expressions in the XQuery, XPath, and XSLT languages. A draft specification for XQuery is described in "XQuery 1.0: An XML Query Language", W3C Working Draft 4 Apr. 2005, located at "http://www.w3.org/TR/xquery/", the entire contents of which are incorporated by reference for all purposes as if fully set forth herein. A draft specification for XPath is described in "XML Path Language (XPath) 2.0", W3C Working Draft 4 Apr. 2005, located at "http://www.w3.org/TR/xpath20/", the entire contents of which are incorporated by reference for all purposes as if fully set forth herein. A draft specification for XSLT is described in "XSL Transformations (XSLT) Version 2.0", W3C Working Draft 4 Apr. 2005, located at "http://www.w3.org/TR/xslt20/", the entire contents of which are incorporated by reference for all purposes as if fully set forth herein. A draft specification for the XQuery Data Model is described in "XQuery 1.0 and XPath 2.0 Data Model", W3C Working Draft 4 Apr. 2005, located at "http://www.w3.org/TR/xpath-datamodel/", the entire contents of which are incorporated by reference for all purposes as if fully set forth herein.

The XQuery Data Model is generally based on the XML specification, but further requires support of at least the following new features:

Support for XML Schema types. The XML Schema recommendations define features, such as structures and simple data types, that extend the definitions in the XML specification with precise type information;

Representation of collections of documents and of complex values; and

Support for typed atomic values.

In order to support processing of queries defined according to this new XQuery Data Model, an XML-enabled computer system or systems need to provide for efficient representation and processing of instances of this data model. As referred to herein, an instance of the XQuery Data Model is a block of data that conforms to the requirements set forth in the data model specification. For example, the processing of the following query written in the XQuery language,

```
<bib>
    {
        for $b in doc ("http://bstore1.example.com/bib.xml") /bib/book
        where $b/publisher = "Addison-Wesley" and $b/@year > 1991
        return
            <book year="{ $b/@year }">
                { $b/title }
            </book>
    }
</bib>
``` requires at least parsing the query and identifying the instances of the XQuery Data Model, compiling the query and optimizing it if necessary, executing the query, and returning any result set to user.

Since the tasks related to processing an XQuery query may be performed by separate components of the same or a different computer system, the XQuery Data Model instances need to be represented in a uniform manner that is recognizable by the different components and/or computer systems. However, the currently existing mechanisms and techniques for representing XML information do not provide support for the new, strongly typed structural elements defined in the XQuery Data Model, such as, for example, atomic values and document nodes. For example, in an XML-enabled RDBMS that provides a native XMLType, the techniques described in the '393 application provide for representing and transferring a serialized image of XML data. However, since these techniques are developed to support XML data that conforms to the original XML specification, these techniques provide only for representing XML documents and XML fragments and do not address the issues raised by the introduction of the new, strongly typed structural elements in the XQuery Data Model.

Based on the foregoing, there is a clear need for techniques that provide for an efficient representation of instances of the XQuery Data Model that may be used in a variety of operational contexts.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
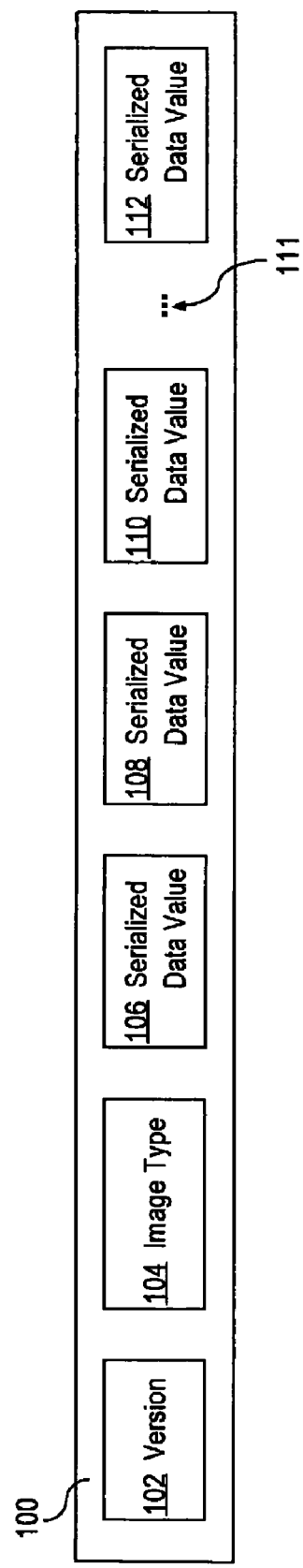
FIG. 1 is a block diagram that illustrates an overview of the structure of a serialized image of XML information according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques for representing XML information are described herein. A serialized image of XML information is generated. The serialized image is a structured block of data representing a sequence. A sequence is a collection of one or more XQuery items, and is an instance of the XQuery data model. The serialized image is a collection of serialized data values, each representing one or more XQuery items. As used herein, an XML value refers to any value represented by the XQuery Data Model, and an instance of the XQuery Data Model may be an XML value. Each particular serialized data value in the serialized image includes an XML value or data that is associated with a particular serialized data value type. Serialized data value types are described hereinafter. In some embodiments, in addition to the collection of one or more serialized data values, a serialized image may also include a field for storing a value, which value indicates that the serialized image includes the collection of one or more serialized data values.

The techniques described herein provide for generating the serialized image by concatenating the serialized data values in a collection of one or more serialized data values. In one embodiment, after a request to generate a serialized image of XML information is received, the serialized image is created and opened for writing by making a call to the component of the computer system that is generating the image. The data for each serialized data value is retrieved based on the request. Each serialized data value is then generated, and a write call is made to add the serialized data value to the serialized image. After the series of write calls that add serialized data values to the serialized image are completed, a call is made to the component of the computer system to close the image. After the image is closed, it may be processed as indicated in the request.

The techniques described herein for serializing XML information may be used in a variety of contexts. For example, a serialized image of XML information generated according to the techniques described herein may be transferred from one component of a computer system to another component of the same system. Alternatively or in addition, a serialized image generated according to the techniques described herein may also be transferred from one computer system to another, or may be stored in a location in persistent or non-persistent storage that is shared by separate components of the same or a different computer system. Further, in some embodiments the serialized image may be structured as a stream that carries the collection of the one or more serialized data values. Thus, the techniques described herein are not limited to any particular context that may use serialized images.

After generating the serialized image, the data included in the serialized data values in the collection of one or more serialized data values may be retrieved and processed.

Operational Contexts

The techniques for serializing instances of the XQuery Data Model may be implemented in a wide variety of operational contexts. For example, serialized images of XML information as described herein may be transferred between separate components of the same computer system or between different computer systems.

For example, the techniques described herein may be implemented in a database system. The database system may receive an XQuery query from a client application, where the client application sends the elements of the query in a serialized image that is structured according to the techniques described herein. The database system receives the serialized image and extracts the elements of the XQuery query from it. The database system may then process the query, where the processing may involve creating serialized images according to the techniques described herein and transferring these images between components of the database system that participate in processing the query, such as, for example, between XQuery parsers, XQuery type checkers, XML compilers, etc. Depending on the particular implementation, serialized images generated according to the techniques described herein may be transferred between any entities, such as, for example, between processes in the same database system, between threads running in the same database system process, between two or more separate instances of the database system, between remote nodes of a distributed database system, and between separate processes that facilitate parallel processing of a query in a database system or systems.

Since the XQuery Data Model elements are strongly typed, the techniques described herein provide for lossless representation of XML information. The data types and other characteristics identified in any instances of the XQuery Data Model are preserved in the serialized images during any transfer or processing of the images in order to guarantee accurate and efficient processing of the underlying XQuery elements or documents represented by the instances.

Further, the serialized images of XML information described herein may be generated in response to a wide variety of requests.

For example, in one embodiment an object-relational database system supports a built-in XMLType data type for storing XML information natively in the database system. The XMLType data type is based on the SQL/XML standard defined in INCITS/ISO/IEC 9075-14:2003, the entire contents of which are incorporated herein by reference, and which is referred to hereinafter as the "SQL/XML 2003" standard. In this embodiment, the XMLType extends the SQL/XML 2003 standard by providing support for representing instances of the XQuery Data Model. To be compatible with the SQL/XML 2003 standard, this embodiment provides a type modifier to the XMLType, specified in parenthesis, which identifies the standard to which the XMLType conforms. For example, XML(CONTENT) stands for an XMLType that conforms to the SQL/XML 2003 standard; XML(SEQUENCE) stands for an XMLType that conforms to the XQuery Data Model and that is part of the new SQL/XML version. In this embodiment, an XMLType without the modifier (e.g. XML( )) is defaulted to XML(CONTENT). In addition, an XMLType with a DOCUMENT type modifier (e.g. XML(DOCUMENT)) may be used in this embodiment to represent XML(CONTENT) instances whose IS_DOCUMENT predicate is true (e.g. XMLType instances that are proper XML documents).

In this embodiment, querying of XML information is fully supported by using XQuery as the query language. The querying of XML information involves exchanging instances of the XQuery Data Model (as represented by the XMLType (SEQUENCE)) by using serialized images generated according to the techniques described herein. The serialized images may be generated by a variety of components and in response to a variety of circumstances. The serialized image may include instances of any supported XMLType, such as, for example, XML(SEQUENCE), XML(CONTENT), and XML(DOCUMENT). For example, an XMLType instance may be included in a serialized image for storing an XML document in an XMLType table or an XMLType column. In another example, XMLType instances may be generated from relational tables and views using SQL/XML 2003 publishing functions, such as XMLElement( ) and XMLAgg( ). The XMLType instances may then be included in a serialized image and the image may be further processed by the components in the database system that handle the publishing functions. In another example, XMLType instances may be generated from the result of an XQuery query embedded in an XMLQuery( ) function. In this example, after being generated, the XMLType instances may be included in a serialized image generated according to the techniques described herein and transferred to the client that called the XMLQuery( ) function. In another example, XMLType instances may be generated from the result of an XPath embedded in an Extracto function, and may be included in a serialized image for processing by the component that executed the Extract( ) function. In another example, an XMLType instance may be the return type of a user-defined or system-defined function, and may be included in a serialized image for processing by any component that calls the function. In another example, an XMLType instance can be converted from an object type, collection type or an arbitrary user-defined opaque type in the object-relational database system, or may be included in any SQL or functional operator in the database system. In this example, the XMLType instance may be included in a serialized image according to the techniques described herein and the image may be processed by any component of the database system that makes use of the object type, collection type, user-defined opaque type, or the operator supported by the database system.

Further, the techniques described herein for serialized representation of instances of the XQuery Data Model may be implemented in any computer system or systems that support processing or exchanging XML information. Examples of such systems include, but are not limited to, database systems, web systems, e-mail systems, OnLine Analytical Processing (OLAP) systems, and any systems capable of exchanging information over network data exchange protocols. Thus, the techniques described herein are not limited to any particular implementations, purpose, or use, and the examples provided herein are to be regarded in an illustrative rather than a restrictive sense.

Serialized Data Value Types

A serialized data value type describes a serialized data value, which corresponds to one or more XQuery items that are represented in a serialized image. An XQuery item is data which may be used in an XQuery expression and for which the XQuery Data Model provides at least a definition and a structure. As referred to herein, serialized data value types include any types that can describe now known or later defined XQuery items. The serialized data value types described herein include, but are not limited to, an atomic type, a range type that describes a set of sequential atomic values, and a node type that may be any one of an XQuery attribute type, an XML element type, an XQuery document type, an XML schema-based element type, an XML attribute type, an XML comment type, and an XML processing-instruction type. In addition, some embodiments may also support a dynamic function serialized data value type. A dynamic function serialized data value type describes a serialized data value, which may be generated on demand by a dynamic function or structure and which may represent an XQuery sequence or one or more XQuery items in a serialized image.

The XQuery items referred to herein are associated with XQuery item types that are described in the XQuery specification "XQuery 1.0: An XML Query Language", W3C Working Draft 4 Apr. 2005, located at "http://www.w3.org/TR/xquery/", the entire contents of which has been incorporated herein by reference, and in the XQuery Data Model specification "XQuery 1.0 and XPath 2.0 Data Model", W3C Working Draft 4 Apr. 2005, located at http://www.w3.org/TR/xpath-datamodel/", the entire contents of which has been incorporated herein by reference.

According to the XQuery specification and the XQuery Data Model specification, every XQuery item is either an atomic value or a node. An atomic value (e.g. the number "5" or the string "Hello world") is data stored in the value space defined by an XQuery atomic type. A node (e.g. an XML element or an XML document) is an instance of one of the node kinds defined in the XQuery Data Model specification. Each node has a unique node identity, a typed value, and a string value. In addition, some nodes may have a name. The typed value of a node is a series of zero or more atomic values. The string value of a node is a value of type "xs:string", which is a character data type defined for the XML Information Set. The name of a node is a value of type "xs:QName", which is a data type that describes a qualified name as defined in the XQuery specification.

Some examples of XQuery item types that may be represented in serialized images by serialized data value types are provided below:
  "xs:date" refers to the built-in atomic date data type named "xs:date";
  "attribute( )?" refers to an optional attribute node;
  "element( )" refers to any element node;
  "element(po:shipto, po:address)" refers to an element node that has the name "po:shipto" and has the type annotation "po:address" (which may be a schema type describing a post office address);
  "element(*, po:address)" refers to an element node of any name that has the type annotation "po:address" (or a type derived from po:address);
  "element(customer)" refers to an element node named "customer" with any type annotation;
  "schema-element(customer)" refers to an element node whose name is "customer" and whose type annotation matches the schema type declared for a customer element in a schema declaration;
  "node( )*" refers to a series of zero or more nodes of any kind.

Structure of a Serialized Image

A serialized image of XML information is a structured block of data that contains a collection of one or more serialized data values. A serialized data value is a structured block of data that corresponds to an instance of an XML value. In some embodiments, the XML value included in a serialized data value may be an instance of the XQuery Data Model. In other embodiments, for compatibility reasons, an XML value included in a serialized data value may also be an instance of a type aligned with the SQL/XML 2003 standard, or with any other XML-defined type that is now known or later developed.

FIG. 1 is a block diagram that illustrates an overview of the structure of a serialized image of XML information according to an embodiment. Serialized image 100 comprises image type field 104, and one or more serialized data values, such as serialized data values 106, 108, 110, and 112. In FIG. 1, ellipsis 111 indicates that serialized image 100 may include any number of serialized data values. Serialized image 100 may optionally comprise a version field 102.

The optional version field 102 stores a value that indicates a version of the image. In different embodiments, the version of the image may be associated with particular parameters, such as, for example, one or more parameters that indicate the version of the system generating and/or processing the image (e.g. an operating system version, a database system version, etc.)

In some embodiments, image type field 104 is used to identify the type of image 100 as an image that stores a collection of serialized data values and that is used in serialized representation of instances of the XQuery Data Model. For example, in a database system that supports the XMLType described above, image type field 104 may store a first value to indicate that the particular serialized image stores instances of XMLType(SEQUENCE), which type is used by the database system to represent instances of the XQuery Data Model. In the same database system, a different second value stored in image type field 104 may indicate that the particular serialized image stores instances of XMLType(CONTENT), which type is used by the database system to represent instances aligned with the SQL/XML 2003 standard.

A serialized data value included in serialized image 100, such as serialized data value 102, is a structured block of data that stores an instance of the XQuery Data Model. Each serialized data value in serialized image 100 includes data that is associated with a serialized data value type as described herein. The structure of each serialized data value corresponds to the structures defined for the particular serialized data value type that describes the serialized data value. In general, each serialized data value in serialized image 100 includes a serialized data value type field and a payload. The serialized data value type field stores a value that indicates the particular serialized data value type of the data that is stored in the serialized data value. The payload comprises the data that is stored in the particular serialized data value. The particular fields and other structural elements for supporting the different serialized data value types are described hereinafter.

In some embodiments, a serialized image may include only one serialized data value. In other embodiments, a serialized image may include a plurality of serialized data values. In these embodiments, each serialized data value in the plurality of serialized data values may store data that is associated with the same serialized data value type. In addition, each serialized data value in the plurality of serialized data values may store data that is associated with a first serialized data value type that is different from a second serialized data value type that is associated with data stored in one or more different serialized data values of the plurality of serialized data values.

To illustrate the structure of a serialized image generated according to the techniques described herein, consider the following request to serialize data that is associated with different serialized data value types:

R1 (2812, taxclass="exempt", <?xml version=10.0><a>A small XML document</a>) In request R1, "2812" is a numeric value, "taxclass='exempt'" is a standalone attribute, and "<?xml version 1.0><a>A small XML document</a>" is a very small, albeit proper, XML document. Table 1 below depicts some of the fields and their corresponding values that may be included in a serialized image generated in response to request R1 according to the techniques described herein.

TABLE 1

Example of Data Stored in a Serialized Image

| FIELD | VALUE |
|---|---|
| Version | 10gR2 |
| Image Type | SEQUENCE |
| Serialized data value Type | ATOMIC |
| XML Type | xsd:integer |
| Native Type | dtynum |
| Length | 4 |
| Value | 2812 |
| Serialized data value Type | ATTRIBUTE |
| Attribute Name Length | 8 |
| Attribute Name | taxclass |
| Attribute Value Length | 6 |
| Attribute Value | exempt |
| Serialized data value Type | NODE |
| Node Kind | document |
| Version | 2.0 |
| Length | 44 |
| XML Serialization Format | text |
| Node Content | <?xml version=1.0><a>A small XML document</a> |

As shown in the above Table 1, the serialized image stores each data in the request as a serialized data value of a particular serialized data value type. For example, the numeric value "2812" is stored in the image as a serialized data value of serialized data value type "ATOMIC", the attribute "taxclass='exempt'" is stored in the image as a serialized data value of serialized data value type "ATTRIBUTE", and the small XML document is stored in the image as a serialized data value of serialized data value type "NODE". Some of the fields in Table 1 (e.g. fields "XML Data Type", "Native Data Type", etc.) are specific for each particular serialized data value type and are discussed in detail hereinafter.

Structure of a Serialized Data Value of an Atomic Type

Atomic values, which may be represented herein by the atomic serialized data value type, are defined in the XQuery Data Model specification "XQuery 1.0 and XPath 2.0 Data Model", W3C Working Draft 4 Apr. 2005, located at http://www.w3.org/TR/xpath-datamodel/", the entire contents of which has been incorporated herein by reference. For example, the XQuery Data Model specification includes all the primitive data types that are defined in "XML Schema Part 2: Datatypes Second Edition", W3C Working Draft 28 Oct. 2004, located at http://www.w3.org/TR/xmlschema-2/", the entire contents of which is incorporated herein by reference as if fully set forth herein. Examples of these primitive types include the XML data types "xs:QName", "xs:decimal", "xs:boolean", etc. In addition, the XQuery Data Model introduces and provides a schema for five new additional built-in data types, "xdt:untyped", "xdt:untypedAtomic", "xdt:anyAtomicType", "xdt:dayTimeDuration", and "xdt:yearMonthDuration".

Figure 2:
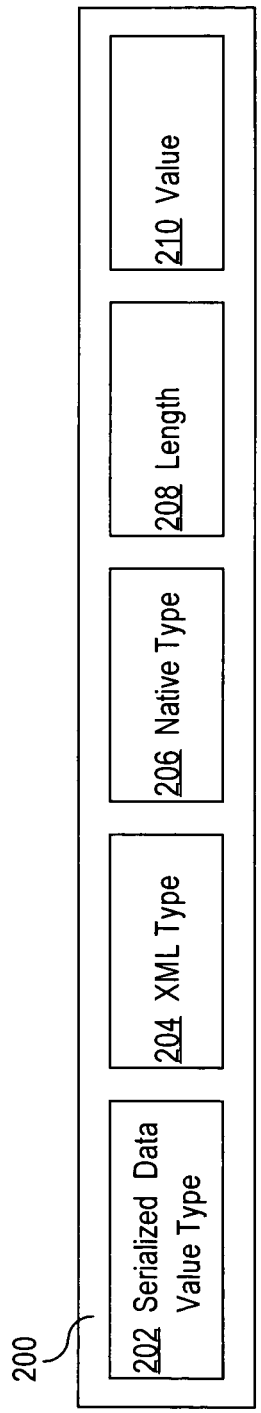
FIG. 2 is a block diagram that illustrates an overview of the structure of a serialized data value that stores an atomic value according to an embodiment.

According to one embodiment, the structure of a serialized data value that includes data associated with an atomic serialized data value type is illustrated in FIG. 2. Serialized data value 200 comprises serialized data value type field 202, XML type field 204, native type field 206, length field 208, and value field 210.

Serialized data value type field 202 stores a value which indicates that the particular serialized data value includes data that is associated with an atomic serialized data value type.

XML type field 204 stores a value which indicates the XML data type of the data stored in the particular serialized data value. For example, if the particular serialized data value stores data for which the atomic XML data type is integer, then this field would store the value "xs:integer".

Native type field 206 stores a value which indicates the native data type of the data stored in the particular serialized data value. The native data type is a data type supported by the computer system which generates the serialized image according to the techniques described herein; specifically, the native data type indicated by the value in native type field 206 is the data type used by the computer system to represent data that is associated with the XML type specified in field 204. For example, in a database system in which integers are represented by a Structured Query Language (SQL) data type, native type field 206 may store the value "SQL Number Type".

In representing data of atomic serialized data value types, the techniques described herein provide for storing both the XML data type and the native data type for data that is included in serialized data values of the serialized image. Any specific information about the original data type of the data is preserved when the data is processed or transferred. For example, for numeric data, specific information about the data, such as, for example, arithmetic signs of integers, precision of real numbers, etc., is preserved in order to facilitate accurate processing of the data if the data is transferred. In this way, the techniques described herein provide for a lossless representation of instances of the XQuery Data Model.

Length field 208 stores a value which indicates the length of the data stored in value field 210. Depending on the particular implementation, the value stored in length field 208 may indicate a number of bytes, a number of bits, or any other data length indication that may be used by the computer system processing the value. Value field 210 stores the value of the instance of the XQuery Data Model, to which the particular serialized data value corresponds.

To illustrate the structure of a serialized data value storing data associated with an atomic serialized data value type, consider the following request R2:

R2 (2812)

In request R2, "2812" is a numeric value of the "xsd:integer" type. Suppose that the request is received by a database system in which numeric values of an integer data type are stored as SQL DTYNUM data type, where values of the DTYNUM data type are 4 bytes in length. In this case, a serialized data value generated in response to request R2 according to the techniques described herein comprises the fields and their corresponding values as shown in Table 2.

TABLE 2

Example of Data Stored in a Serialized Data Value of Atomic Type

| FIELD | VALUE |
|---|---|
| Serialized data value Type | ATOMIC |
| XML Type | xsd:integer |
| Native Type | DTYNUM |
| Length | 4 |
| Value | 2812 |

Structure of a Serialized Data Value of a Range Type

In one embodiment, the techniques described herein provide for a range serialized data value type. Logically, an instance of the range serialized data value type is an aggregation of instances that represents a plurality of serialized data values of a particular serialized data value type. In this embodiment, the range serialized data value type is defined as a separate serialized data value type in order to provide a scalable and efficient representation of a set of sequential XQuery values.

For example, suppose that a computer system needs to process an XQuery query that includes the range of values "1 to 1000". Instead of generating and possibly transferring one thousand separate serialized data values, where each serialized data value stores an instance of an integer associated with an atomic serialized data value type, the techniques described herein provide for creating a single instance of the range serialized data value type, which instance indicates a set of sequential integer values from "1" to "1000".

Figure 3:
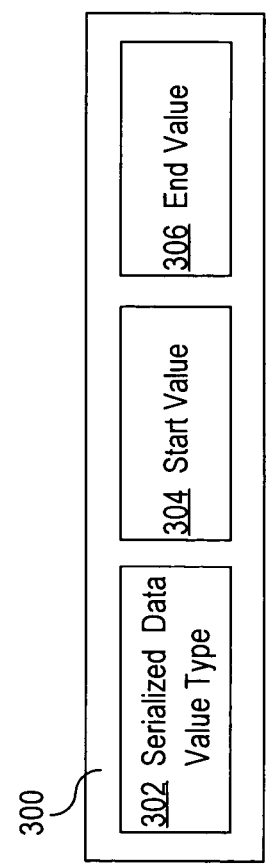
FIG. 3 is a block diagram that illustrates an overview of the structure of a serialized data value that stores a range of values according to an embodiment.

According to one embodiment, the structure of a serialized data value that includes data associated with a range serialized data value type is illustrated in FIG. 3. In this embodiment, serialized data value 300 comprises serialized data value type field 302, start value field 304, and end value field 306.

Serialized data value type field 302 stores a value which indicates that the particular serialized data value stores data that is associated with a range serialized data value type.

Start value field 304 stores the start value in the range represented by serialized data value 300. End value field 306 stores the end value in the range represented by serialized data value 300.

In this embodiment, the start value and the end value stored in start value field 304 and end value field 306, respectively, are represented in the serialized data value 300 in a data type that is native to the computer system that generates and processes the serialized image in which serialized data value 300 is included. Since according to the XQuery Data Model a range of values is always of "xs:integer" atomic type, in this embodiment the start and end values of a range are stored in a native data type in order to facilitate a more efficient transfer by providing for a smaller serialized image. For example, if the computer system is a database system that uses the SQL DTYNUM data type, then values stored in start value field 304 and end value field 306, respectively, are represented in the DTYNUM data type by default. In other embodiments, a serialized data value of the range serialized data value type may include one or more additional fields, the values of which may indicate the XML data type and/or the native data type of one or both of the start and end value of a value range represented in an instance of the range serialized data value type.

To illustrate the structure of a serialized data value storing data associated with a range serialized data value type, consider the following request R3:

R3 (1 to 1000)

In request R3, "1 to 1000" is a range of atomic values of the "xs:integer" XML data type. A serialized data value generated in response to request R3 according to the techniques described herein comprises the fields and their corresponding values as shown in Table 3.

TABLE 3

Example of Data Stored in a Serialized Data Value of Range Type

| FIELD | VALUE |
|---|---|
| Serialized data value Type | RANGE |
| Start Value | 1 |
| End Value | 1000 |

Structure of a Serialized Data Value of an Attribute Type

In one embodiment, a separate serialized data value type is provided to represent standalone XML attributes. A standalone attribute is an attribute that needs to be processed separately from the XML data or XQuery expression in which it is defined.

Figure 4A:
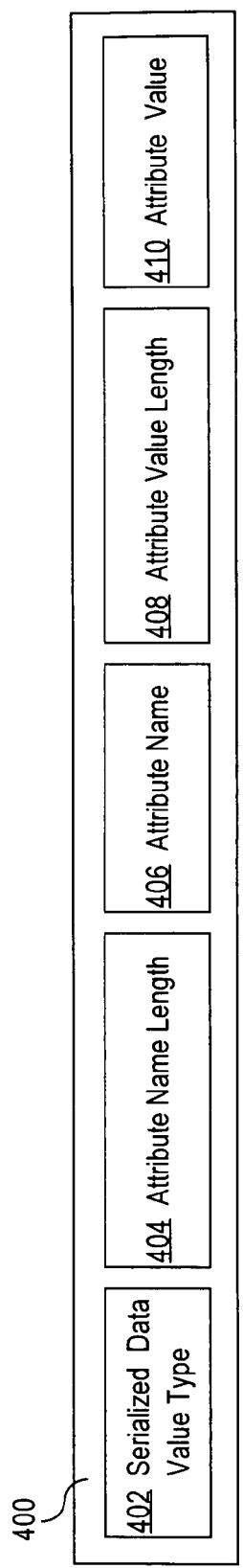
FIG. 4A is a block diagram that illustrates an overview of the structure of a serialized data value that stores a standalone attribute according to an embodiment.

According to one embodiment, the structure of a serialized data value that includes data associated with an attribute serialized data value type is illustrated in FIG. 4A. In this embodiment, serialized data value 400 comprises serialized data value type field 402, attribute name length field 404, attribute name field 406, attribute value length field 408, and attribute value field 410.

Serialized data value type field 402 stores a value which indicates that the particular serialized data value stores data that is associated with an attribute serialized data value type.

Attribute name length field 404 stores a value which indicates the length of the attribute name in number of bytes. Attribute name field 406 stores the value of the name of the attribute. In some embodiments, the attribute name may be an XQuery qualified name. In these embodiments, attribute name field 406 stores the values which indicate the different portions that comprise an XQuery qualified name. The structures for representing the different portions of an XQuery qualified name are described hereinafter.

Attribute value length field 408 stores a value which indicates the length of the attribute value in bytes. Attribute value field 410 stores the value of the attribute.

To illustrate the structure of a serialized data value storing data associated with an attribute serialized data value type, consider the following XML element:

<a taxclass="exempt">Baby Food</a>

Suppose that, even though the attribute "taxclass='exempt'" is defined in the above XML element, the computer system that processes the XML data needs to process this attribute separately from the XML element. Consider the following request R4:

R4 (taxclass="exempt")

In request R4, "taxclass='exempt'" is considered a standalone attribute, and according to the techniques described herein it is represented by an instance of the attribute serialized data value type. A serialized data value generated in response to request R4 according to the techniques described herein comprises the fields and their corresponding values as shown in Table 4.

TABLE 4

Example of Data Stored in a Serialized Data Value of Attribute Type

| FIELD | VALUE |
| --- | --- |
| Serialized data value Type | ATTRIBUTE |
| Attribute Name Length | 8 |
| Attribute Name | taxclass |
| Attribute Value Length | 6 |
| Attribute Value | exempt |

Structure of a Serialized Data Value which Includes a Qualified Name

According to the XQuery Data Model, qualified names may be used in XML data to identify different XML entities, such as, for example, attributes, variables, and functions. A qualified name, or a QName, is a set of three values representing: a possibly empty namespace, a possibly empty prefix, and a local name. The full definition of qualified names is provided in "Namespaces in XML", W3C 14 Jan. 1999, located at "http://www.w3.org/TR/REC-xml-names/", the entire contents of which are herein incorporated by reference as if fully set forth herein.

In one embodiment, an attribute name of a standalone attribute may be a qualified name. According to this embodiment, the structure of a qualified attribute name, such as the attribute name described in field 406 of FIG. 4A, is illustrated in FIG. 4B.

Figure 4B:
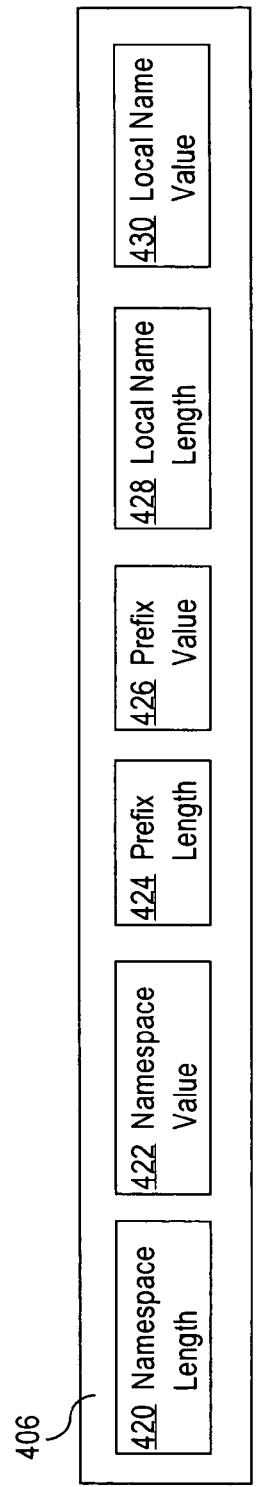
FIG. 4B is a block diagram that illustrates an overview of the structure of an attribute name field that stores a qualified name according to an embodiment.

Referring to FIG. 4B, serialized data value 406 comprises namespace length field 420, namespace value field 422, prefix length field 424, prefix value field 426, local name length field 428, and local name value field 430.

Namespace length field 420 stores a value which indicates the length of the namespace in number of bytes. Namespace value field 422 stores the value of the namespace. Prefix length field 424 stores a value which indicates the length of the prefix in number of bytes. Prefix value field 426 stores the value of the prefix. Local name length field 428 stores a value which indicates the length of the local name in number of bytes. Local name value field 422 stores the value of the local name.

To illustrate the structure of a qualified attribute name, consider the following XML element:

```
<x xmlns:edi="http://ecommerce.org/schema/">
    <a edi:taxclass="exempt">Baby Food</a>
</x>
```

The name of the "taxclass" attribute in the "<a>" XML element is a qualified name because it is qualified by the prefix "edi". The prefix "edi" is specified as an attribute of the parent "<x>" XML element and is defined in the XML namespace schema located at "http://ecommerce.org/schema/". Consider the following request R5:

R5 (edi:taxclass="exempt")

In request R5, "edi:taxclass='exempt'" is considered a standalone attribute of attribute serialized data value type, which has a qualified attribute name. A serialized data value generated in response to request R5 according to the techniques described herein comprises the fields and their corresponding values as shown in Table 5.

TABLE 5

Example of a Serialized Data Value of Attribute Type with a Qname

| FIELD | VALUE |
| --- | --- |
| Serialized data value Type | ATTRIBUTE |
| Attribute Name Length | 39 |
| Namespace Length | 28 |
| Namespace Value | http://ecommerce.org/schema/ |
| Prefix Length | 3 |
| Prefix Value | edi |
| Local Name Length | 8 |
| Local Name Value | taxclass |
| Attribute Value Length | 6 |
| Attribute Value | exempt |

In other embodiments, any XML entity may be identified by an XQuery qualified name. These embodiments may use structures similar to the structures described herein for representing a qualified attribute name to represent any qualified name, such as, for example, a variable name, a function name, etc. Further, some embodiments may provide a separate serialized data value type to represent standalone qualified names as separate instances of the XQuery Data Model.

Figure 6:
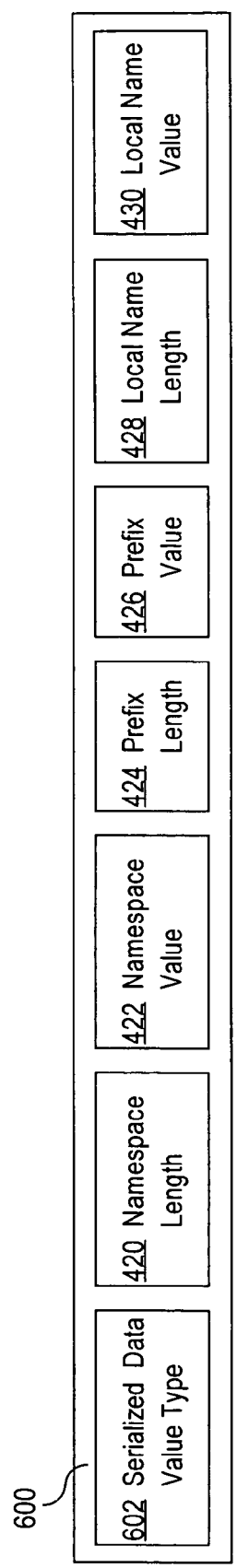
FIG. 6 is a block diagram that illustrates an overview of the structure of a serialized data value that stores a standalone qualified name according to an embodiment.

For example, in some embodiments a serialized data value may include data associated with a qualified name serialized data value type. One possible structure of such serialized data value is illustrated in FIG. 6. In FIG. 6, serialized data value 600 comprises serialized data value type field 602, namespace length field 420, namespace value field 422, prefix length field 424, prefix value field 426, local name length field 428, and local name value field 430.

Serialized data value type field 602 stores a value which indicates that the particular serialized data value includes data that is associated with a qualified name serialized data value type. The value stored in serialized data value type field 602 may be character data identifying the qualified name serialized data value type, such as, for example, the string "QNAME". The rest of the fields in serialized data value 600, namely fields 420, 422, 424, 426, 428, and 430 may be the same as the fields described above with respect to FIG. 4B.

Structure of a Serialized Data Value of a Node Type

The XQuery item types that represent XQuery nodes are defined in the XQuery specification "XQuery 1.0: An XML Query Language", W3C Working Draft 4 Apr. 2005, located at "http://www.w3.org/TR/xquery/", the entire contents of which has been incorporated herein by reference. The XQuery specification defines the following node item types: XML attribute type, XML element type, XML document type, XML schema-based element type, XML schema-based attribute type, XML comment type, and XML processing-instruction type.

Figure 5:
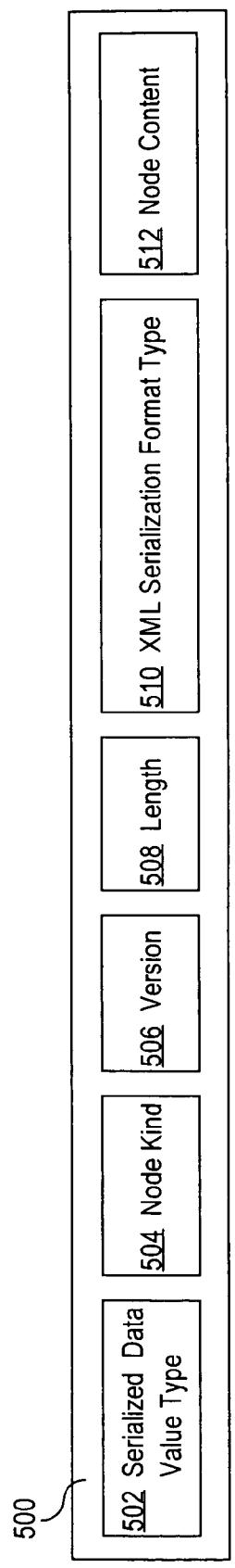
FIG. 5 is a block diagram that illustrates an overview of the structure of a serialized data value that stores an XQuery node according to an embodiment.

According to one embodiment, the structure of a serialized data value that includes data associated with a node serialized data value type is illustrated in FIG. 5. In this embodiment, serialized data value 500 comprises serialized data value type field 502, node kind field 504, length field 508, XML serialization format field 510, and node content field 512. In this embodiment, serialized data value 500 may optionally include a version field 506.

Serialized data value type field 502 stores a value which indicates that the particular serialized data value stores data that is associated with a node serialized data value type.

Node kind field 504 stores a value that indicates the particular kind of the XQuery node. For example, a first value stored in node kind field 504 may indicate that the content stored in node content field 512 is an XML element. A second value stored in node kind field 504 may indicate that the content stored in content field 512 is an XML document. Similarly, different values may be stored in node kind field 504 to indicate the different types of nodes that are supported by the node serialized data value type. In this way, the node instances of the XQuery Data Model included in a serialized image according to the techniques described herein may be properly processed by a computer system that generates and processes the serialized image. This feature is helpful when the node XQuery Data Model instances are included in XQuery queries, in the processing of which it makes a difference whether the node instance being passed is an entire XML document, or just an element of the document.

XML serialization format type field 510 includes a value which indicates the format of the content stored in node content field 512. Since the content of a node instance of the serialized data value type may be rather large, in some embodiments a serialization format is provided to facilitate a more efficient transfer of XML information. A set of possible XML serialization formats that may be used in these embodiments are described in the '393 application. For example, the XML serialization format may be an uncompressed text format, a compressed text format, a format for a locator of a large object in persistent storage that stores compressed XML data (e.g. a locator for a Large OBject (LOB)), a format for a reference to an object represented by an instance of a serialized data value type (e.g. XMLREF reference pointing to an object of XMLType in a object-relational database system), a format used as the format for images of serialized objects (e.g. OBJIMG format of images stored in persistent or non-persistent storage in a object-relational database system), and a format for a pointer to a shared location in memory where an instance of the node serialized data value type is stored (e.g. pointer to a shared location in the physical memory of a database system).

In some embodiments, serialized data value 500 may optionally include version field 506. Version field 506 stores a value which indicates a particular version of serialized data value 500. For example, in some embodiments, fields 506, 510, and 512 are included in images that were provided for storing instances of an XMLType that is aligned with the SQL/XML 2003 standard. In these embodiments, in order to provide a backward compatibility, such images may be stored directly in serialized data value 500. In these embodiments, the value stored in version field 506 of a particular serialized data value may be used to indicate whether the data of the instance stored in the serialized data value is of an SQL/XML type or of an XQuery Data Model type.

Length field 508 stores a value which indicates the length of the content stored in node content field 512. Node content field 512 stores the content of the node instance of the node serialized data value type that is included in serialized data value 500 in the format indicated by XML serialization format type field 510.

To illustrate the structure of a serialized data value storing data associated with a node serialized data value type, consider the following request R6:

R6 (<?xml version=1.0><a>A small XML document</a>)

In request R6, "<?xml version=1.0a>A small XML document</a>" is a proper XML document that is of a node serialized data value type, which node type is of the document kind. A serialized data value generated in response to request R6 according to the techniques described herein comprises the fields and their corresponding values as shown in Table 6.

TABLE 6

Example of Data Stored in a Serialized Data Value of a Node Type

| FIELD | VALUE |
| --- | --- |
| Serialized data value Type | NODE |
| Node Kind | document |
| Version | 2.0 |
| Length | 44 |
| XML Serialization Format Type | uncompressed text |
| Node Content | <?xml version=1.0><a>A small XML document</a> |

In some embodiments, the techniques described herein provide for minimizing the size of serialized images that store serialized data values that include data associated with node serialized data value types. A call is made to open a serialized image, and the data of a particular serialized data value is initially being written in the image. Since instances of the node serialized data value type may get very large, a record is kept of how much information is written to the serialized image. When the size of the serialized image exceeds a predefined threshold, a pointer to a LOB in permanent storage is written in the node content field of the particular serialized data value, and the value in the XML serialized format type field is changed to indicate a "pointer-to-LOB" format. The data from the instance of the node serialized data value type is then transferred and written to a LOB in persistent storage. In this way, the size of the particular serialized data value, and respectively the size of the serialized image in which the particular serialized data value is included, is kept to a minimum while at the same time allowing relatively small instances of node types to be stored entirely in the image. This technique provides for efficient utilization of the computer system resources related to storing and transferring XML information, such as, for example, memory, persistent storage space, and CPU utilization.

Other Serialized Data Value Types

The techniques described herein allow for additional serialized data value types to be defined when there is a need to efficiently support serialization of specific instances of the XQuery Data Model that are related in some way. Instead of serializing related serialized data values of a particular serialized data value type or types, a new serialized data value type may be defined for representing these related serialized data values, where one serialized data value of this new serialized data value type will store enough information to uniquely identify the serialized data values and the relationships among them. In this way, the data stored in the related serialized data values can be efficiently transferred and processed without the need to serialize each separate serialized data value.

For example, a serialized data value type may be defined to support instances of values that are sequential but do not necessarily differ by equal increments. The dynamic function serialized data value type is an example of such serialized data value type. A serialized data value of a dynamic function serialized data value type may be used to store a set of values of a Fibonacci series that is generated by a function in an XQuery expression. In another example, a serialized data value type may be defined to support instances of serialized images that themselves include a collection of serialized data values storing XQuery values. A serialized data value of such serialized data value type may be used to represent two sets of serialized data values when one set is a superset of the other. Thus, the described techniques are not limited to the particular serialized data value types described in detail herein, and a wide variety of different serialized data value types may be defined in order to efficiently support a wide variety of situations in which transfer and processing of XML information is required.

Hardware Overview

Figure 7:
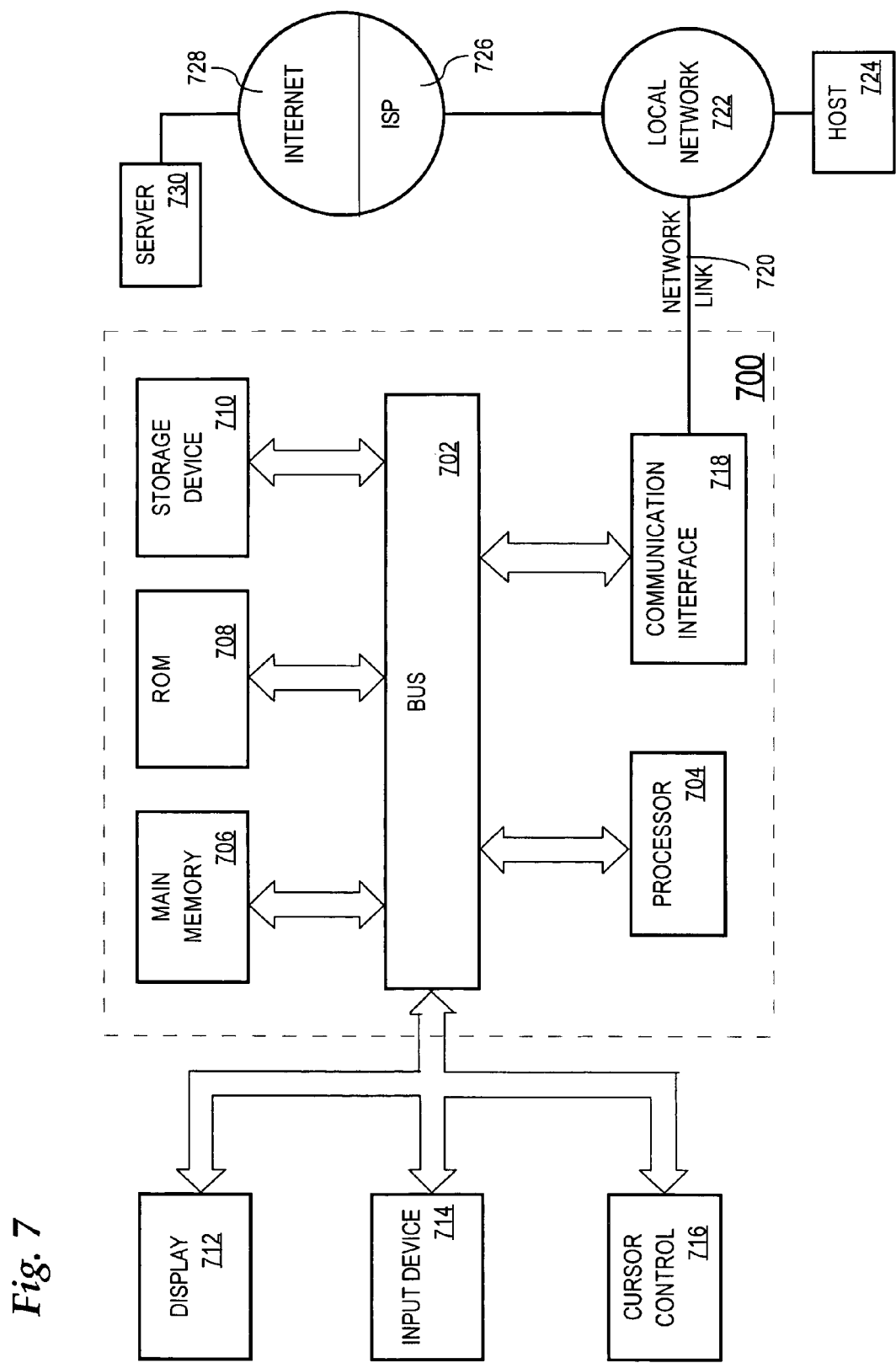
FIG. 7 is a block diagram that illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for representing eXtensible Markup Language (XML) information, comprising the computer-implemented steps of:
   generating a serialized image of XML information, wherein the serialized image comprises:
      a collection of two or more serialized data values, wherein each particular serialized data value in the collection includes data associated with a particular serialized data value type of a plurality of serialized data value types;
      wherein the plurality of serialized data value types includes two or more of: an atomic type, a range type that describes a set of sequential items, an attribute type, a qualified name type, a dynamic function type, and a node type;
      wherein the plurality of serialized data value types are defined in a data model specification that defines at least structures and data types for XML information;
      wherein the collection of two or more serialized data values includes: a first serialized data value that is associated with a first serialized data value type of the plurality of serialized data value types, and a second serialized data value that is associated with a second serialized data value type of the plurality of serialized data value types, wherein the first serialized data value type is different than the second serialized data value type; and
      a first field that includes a first value which indicates that the serialized image includes the collection of two or more serialized data values;
   wherein the method is performed by one or more computing devices.

2. The method of claim 1, wherein each of the two or more serialized data values represents one or more XQuery items in the serialized image.

3. The method of claim 1, wherein the node type describes any one of an XML attribute, an XML element, an XML document, an XML schema-based element, an XML schema-based attribute, an XML comment, and an XML processing-instruction.

4. The method of claim 1, further comprising:
   retrieving, from the serialized image, the data included in at least one serialized data value in the collection of two or more serialized data values; and
   processing the data retrieved from the serialized image;
   wherein the steps of the method are performed at a database system that supports a native XML data type, wherein the XML information is one or more instances of the native XML data type.

5. The method of claim 1, wherein each particular serialized data value in the collection of two or more serialized data values comprises:
   a payload that comprises the data associated with the particular serialized data value type; and
   a serialized data value type field that includes a field value which indicates the particular serialized data value type.

6. The method of claim 5, wherein:
   the field value indicates that the particular serialized data value type is associated with an atomic value;
   the data associated with the particular serialized data value type includes the atomic value; and
   the particular serialized data value further comprises:
      a first data type field, wherein the first data type field includes a first information which indicates a first data type of the atomic value; and
      a length field, wherein the length field includes a third information which indicates the length of the atomic value.

7. The method of claim 6, wherein the first data type of the atomic value is any one of an XML data type and a Structured Query Language (SQL) data type.

8. The method of claim 5, wherein:
   the field value indicates that the particular serialized data value type is associated with a range of values that includes a start value and an end value, wherein the start value and the end value are of a numeric data type;
   the data associated with the particular serialized data value type includes the start value and the end value; and
   the payload further comprises:
      a start value field, wherein the start value field stores the start value; and
      an end value field, wherein the end value field stores the end value.

9. The method of claim 5, wherein:
   the field value indicates that the particular serialized data value type is associated with a standalone attribute, wherein the standalone attribute includes an attribute name and an attribute value;
   the data associated with the particular serialized data value type includes the attribute name and the attribute value, wherein the payload comprises a first portion that stores the attribute name, and a second portion that stores the attribute value; and
   the particular serialized data value further comprises:
      a first length field, wherein the first length field includes a first information which indicates the length of the attribute name; and
      a second length field, wherein the second length field includes a second information which indicates the length of the attribute value.

10. The method of claim 9, wherein:

the attribute name is a qualified XQuery name that comprises a prefix and a local name; and the first portion of the payload further comprises:

- a third length field, wherein the third length field includes a third information which indicates the length of the prefix;
- a prefix field which stores the value of the prefix;
- a fourth length field, wherein the fourth length field includes a fourth information which indicates the length of the local name; and
- a local name field which stores the value of the local name.

11. The method of claim 10, wherein:

the qualified XQuery name further comprises a namespace; and the first portion of the payload further comprises:

a fifth length field, wherein the fifth length field includes a fifth information which indicates the length of the namespace; and a namespace field which stores the value of the namespace.

12. The method of claim 5, wherein:

the field value indicates that the particular serialized data value type is associated with a standalone qualified XQuery name, wherein the qualified XQuery name comprises a namespace, a prefix, and a local name;

the data associated with the particular serialized data value type includes values for at least one of the namespace, the prefix, and the local name; and the particular serialized data value further comprises:

- a first length field, wherein the first length field includes a first information which indicates the length of the namespace;
- a namespace field which stores the value of the namespace;
- a second length field, wherein the second length field includes a second information which indicates the length of the prefix;
- a prefix field which stores the value of the prefix;
- a third length field, wherein the third length field includes a third information which indicates the length of the local name; and
- a local name field which stores the value of the local name.

13. The method of claim 5, wherein:

the field value indicates that the particular serialized data value type is associated with an XQuery node;

the data associated with the particular serialized data value type is a series of bytes that represents the XQuery node; and the particular serialized data value further comprises:

- a node-type field, wherein the node-type field includes a first information that indicates the kind of the XQuery node;
- a length field, wherein the length field includes a second information which indicates the length of the series of bytes; and
- a format field, wherein the format field includes a third information which indicates a format of the series of bytes.

14. The method of claim 13, wherein:

the XQuery node conforms to an XML schema; and the first information indicates that the XQuery node is any one of an XML attribute, an XML element, an XML document, an XML schema-based element, an XML schema-based attribute, an XML comment, and an XML processing-instruction.

15. The method of claim 13, wherein the format of the series of bytes is a particular format of a plurality of XML serialization formats, wherein the plurality of XML serialization formats include at least one of:

- a first format for a locator for a large object in storage that is shared by components of a database system;
- a second format for a reference to an object in the database system, wherein the object can be accessed by components of the database system;
- a third format used as a serialized format for objects in the database system;
- a fourth format for a pointer to a memory location in memory shared by components of the database system;
- a fifth format for compressed text; and
- a sixth format for uncompressed text.

16. The method of claim 1, wherein the step of generating the serialized image comprises:

retrieving the data for each serialized data value in the collection of two or more serialized data values;

generating each serialized data value in the collection of two or more serialized data values; and constructing the serialized image by concatenating each serialized data value in the collection of two or more serialized data values.

17. The method of claim 1, wherein:

the first serialized data value includes first data that is associated with the first serialized data value type of the plurality of serialized data value types; and the second serialized data value includes second data that is associated with the second serialized data value type of the plurality of serialized data value types.

18. A machine-readable volatile or non-volatile medium storing one or more sequences of instructions for representing eXtensible Markup Language (XML) information, which instructions, when executed by one or more processors, cause the one or more processors to perform steps comprising:

generating a serialized image of XML information, wherein the serialized image comprises:

- a collection of two or more serialized data values, wherein each particular serialized data value in the collection includes data associated with a particular serialized data value type of a plurality of serialized data value types;
- wherein the plurality of serialized data value types includes two or more of: an atomic type, a range type that describes a set of sequential items, an attribute type, a qualified name type, a dynamic function type, and a node type;
- wherein the plurality of serialized data value types are defined in a data model specification that defines at least structures and data types for XML information;
- wherein the collection of two or more serialized data values includes: a first serialized data value that is associated with a first serialized data value type of the plurality of serialized data value types, and a second serialized data value that is associated with a second serialized data value type of the plurality of serialized data value types, wherein the first serialized data value type is different than the second serialized data value type; and
- a first field that includes a first value which indicates that the serialized image includes the collection of two or more serialized data values.

19. The machine-readable volatile or non-volatile medium of claim 18, wherein each of the two or more serialized data values represents one or more XQuery items in the serialized image.

20. The machine-readable volatile or non-volatile medium of claim 18, wherein the node type describes any one of an XML attribute, an XML element, an XML document, an XML schema-based element, an XML schema-based attribute, an XML comment, and an XML processing-instruction.

21. The machine-readable volatile or non-volatile medium of claim 18, wherein the one or more sequences of instructions further comprise instructions which, when executed by the one or more processors, cause the one or more processors to perform the steps of:
retrieving, from the serialized image, the data included in at least one serialized data value in the collection of two or more serialized data values; and
processing the data retrieved from the serialized image;
wherein the one or more sequences of instructions are performable at a database system that supports a native XML data type, wherein the XML information is one or more instances of the native XML data type.

22. The machine-readable volatile or non-volatile medium of claim 18, wherein each particular serialized data value in the collection of two or more serialized data values comprises:
a payload that comprises the data associated with the particular serialized data value type; and
a serialized data value type field that includes a field value which indicates the particular serialized data value type.

23. The machine-readable volatile or non-volatile medium of claim 22, wherein:
the field value indicates that the particular serialized data value type is associated with an atomic value;
the data associated with the particular serialized data value type includes the atomic value; and
the particular serialized data value further comprises:
a first data type field, wherein the first data type field includes a first information which indicates a first data type of the atomic value; and
a length field, wherein the length field includes a third information which indicates the length of the atomic value.

24. The machine-readable volatile or non-volatile medium of claim 23, wherein the first data type of the atomic value is any one of an XML data type and a Structured Query Language (SQL) data type.

25. The machine-readable volatile or non-volatile medium of claim 22, wherein:
the field value indicates that the particular serialized data value type is associated with a range of values that includes a start value and an end value, wherein the start value and the end value are of a numeric data type;
the data associated with the particular serialized data value type includes the start value and the end value; and
the payload further comprises:
a start value field, wherein the start value field stores the start value; and
an end value field, wherein the end value field stores the end value.

26. The machine-readable volatile or non-volatile medium of claim 22, wherein:
the field value indicates that the particular serialized data value type is associated with a standalone attribute, wherein the standalone attribute includes an attribute name and an attribute value;
the data associated with the particular serialized data value type includes the attribute name and the attribute value, wherein the payload comprises a first portion that stores the attribute name, and a second portion that stores the attribute value; and
the particular serialized data value further comprises:
a first length field, wherein the first length field includes a first information which indicates the length of the attribute name; and
a second length field, wherein the second length field includes a second information which indicates the length of the attribute value.

27. The machine-readable volatile or non-volatile medium of claim 26, wherein:
the attribute name is a qualified XQuery name that comprises a prefix and a local name; and
the first portion of the payload further comprises:
a third length field, wherein the third length field includes a third information which indicates the length of the prefix;
a prefix field which stores the value of the prefix;
a fourth length field, wherein the fourth length field includes a fourth information which indicates the length of the local name; and
a local name field which stores the value of the local name.

28. The machine-readable volatile or non-volatile medium of claim 27, wherein:
the qualified XQuery name further comprises a namespace; and
the first portion of the payload further comprises:
a fifth length field, wherein the fifth length field includes a fifth information which indicates the length of the namespace; and
a namespace field which stores the value of the namespace.

29. The machine-readable volatile or non-volatile medium of claim 22, wherein:
the field value indicates that the particular serialized data value type is associated with a standalone qualified XQuery name, wherein the qualified XQuery name comprises a namespace, a prefix, and a local name;
the data associated with the particular serialized data value type includes values for at least one of the namespace, the prefix, and the local name; and
the particular serialized data value further comprises:
a first length field, wherein the first length field includes a first information which indicates the length of the namespace;
a namespace field which stores the value of the namespace;
a second length field, wherein the second length field includes a second information which indicates the length of the prefix;
a prefix field which stores the value of the prefix;
a third length field, wherein the third length field includes a third information which indicates the length of the local name; and
a local name field which stores the value of the local name.

30. The machine-readable volatile or non-volatile medium of claim 22, wherein:
the field value indicates that the particular serialized data value type is associated with an XQuery node;

the data associated with the particular serialized data value type is a series of bytes that represents the XQuery node; and the particular serialized data value further comprises:
- a node-type field, wherein the node-type field includes a first information that indicates the kind of the XQuery node;
- a length field, wherein the length field includes a second information which indicates the length of the series of bytes; and
- a format field, wherein the format field includes a third information which indicates a format of the series of bytes.

31. The machine-readable volatile or non-volatile medium of claim 30, wherein:
    the XQuery node conforms to an XML schema; and
    the first information indicates that the XQuery node is any one of an XML attribute, an XML element, an XML document, an XML schema-based element, an XML schema-based attribute, an XML comment, and an XML processing-instruction.

32. The machine-readable volatile or non-volatile medium of claim 30, wherein the format of the series of bytes is a particular format of a plurality of XML serialization formats, wherein the plurality of XML serialization formats include at least one of:
    a first format for a locator for a large object in storage that is shared by components of a database system;
    a second format for a reference to an object in the database system, wherein the object can be accessed by components of the database system;
    a third format used as a serialized format for objects in the database system;
    a fourth format for a pointer to a memory location in memory shared by components of the database system;
    a fifth format for compressed text; and
    a sixth format for uncompressed text.

33. The machine-readable volatile or non-volatile medium of claim 18, wherein the instructions that cause generating the serialized image comprise instructions which, when executed by the one or more processors, cause the one or more processors to perform the steps of:
    retrieving the data for each serialized data value in the collection of two or more serialized data values;
    generating each serialized data value in the collection of two or more serialized data values; and
    constructing the serialized image by concatenating each serialized data value in the collection of two or more serialized data values.

34. The machine-readable volatile or non-volatile medium of claim 18, wherein:
    the first serialized data value includes first data that is associated with the first serialized data value type of the plurality of serialized data value types; and
    the second serialized data value includes second data that is associated with the second serialized data value type of the plurality of serialized data value types.

* * * * *

UNITED STATES PATENT AND TRADEMARK OFFICE
CERTIFICATE OF CORRECTION

| | | |
|---|---|---|
| PATENT NO. | : 7,802,180 B2 | Page 1 of 1 |
| APPLICATION NO. | : 11/246429 | |
| DATED | : September 21, 2010 | |
| INVENTOR(S) | : James W. Warner et al. | |

It is certified that error appears in the above-identified patent and that said Letters Patent is hereby corrected as shown below:

On page 3, in column 2, under "Other Publications", line 22, delete "XQuey" and insert -- XQuery --, therefor.

On page 4, in column 2, under "Other Publications", line 58, delete "Expertrs:" and insert -- Experts: --, therefor.

On page 4, in column 2, under "Other Publications", line 64, delete "Preli Minary" and insert -- Preliminary --, therefor.

On page 5, in column 2, under "Other Publications", line 27, delete "Governement," and insert -- Government, --, therefor.

In column 1, line 10, delete "al" and insert -- al. --, therefor.

In column 1, line 32, delete "extensible" and insert -- eXtensible --, therefor.

In column 6, line 46, delete "Extracto" and insert -- Extract() --, therefor.

In column 9, line 20, delete "10.0>" and insert -- 1.0> --, therefor.

In column 16, line 5, delete "1.0a>A" and insert -- 1.0><a>A --, therefor.

Signed and Sealed this
Sixteenth Day of August, 2011

David J. Kappos
*Director of the United States Patent and Trademark Office*